United States Patent
Holtmanns et al.

(10) Patent No.: US 8,813,171 B2
(45) Date of Patent: Aug. 19, 2014

(54) SYSTEMS, METHODS, AND APPARATUSES FOR FACILITATING AUTHORIZATION OF A ROAMING MOBILE TERMINAL

(75) Inventors: Silke Holtmanns, Klaukkala (FI); Pekka Laitinen, Helsinki (FI)

(73) Assignee: Nokia Corporation, Espoo (FI)

( * ) Notice: Subject to any disclaimer, the term of this patent is extended or adjusted under 35 U.S.C. 154(b) by 22 days.

(21) Appl. No.: 13/318,348

(22) PCT Filed: Apr. 29, 2010

(86) PCT No.: PCT/IB2010/051881
§ 371 (c)(1),
(2), (4) Date: Jan. 16, 2012

(87) PCT Pub. No.: WO2010/125535
PCT Pub. Date: Nov. 4, 2010

(65) Prior Publication Data
US 2012/0110637 A1    May 3, 2012

Related U.S. Application Data

(60) Provisional application No. 61/174,754, filed on May 1, 2009.

(51) Int. Cl.
G06F 17/00 (2006.01)
G06F 7/04 (2006.01)
G06F 15/16 (2006.01)
G06F 15/163 (2006.01)
G06F 15/177 (2006.01)
H04L 29/06 (2006.01)

(52) U.S. Cl.
USPC ............ 726/1; 726/4; 726/6; 713/2; 709/225

(58) Field of Classification Search
USPC ............................ 726/1, 4, 6; 713/2; 709/225
See application file for complete search history.

(56) References Cited

U.S. PATENT DOCUMENTS 7,231,517 B1 *   6/2007  Mashayekhi ................. 713/167
2004/0205193 A1 * 10/2004  Hurtta et al. .................. 709/227
(Continued)

FOREIGN PATENT DOCUMENTS

| CN | 1770686 A | 5/2006 |
| CN | 1934828 A | 3/2007 |

(Continued)

OTHER PUBLICATIONS

"3rd Generation Partnership Project; Technical Specification Group Core Network and Terminals; Access Network Discovery and Selection Function (ANDSF) Management Object (MO); (Release 8)", 3GPP TS 24.312, v8.0.0, Dec. 2008, pp. 1-50.

(Continued)

*Primary Examiner* — Joseph P. Hirl
*Assistant Examiner* — Kalish Bell
(74) *Attorney, Agent, or Firm* — Mintz, Levin, Cohn, Ferris, Glovsky & Popeo, P.C.

(57) ABSTRACT

Systems, methods, and apparatuses are provided for facilitating authorization of a roaming mobile terminal. A method may include receiving a request for security key related policy information for a user equipment device. The request may be sent by a service providing node on a visited network. The method may further include causing a service authorization information request including a user security settings package to be sent to a policy decisioning server. The method may also include receiving, in response to the service authorization information request, a service authorization information answer including a modified user security settings package including the authorization policy information for the user equipment device. The method may additionally include causing the requested security key related policy information to be sent to the service providing node. Corresponding systems and apparatuses are also provided.

17 Claims, 5 Drawing Sheets

(56) References Cited

U.S. PATENT DOCUMENTS

| | | | |
|---|---|---|---|
| 2005/0147072 A1* | 7/2005 | Mahendran et al. | 370/338 |
| 2006/0078119 A1 | 4/2006 | Jee et al. | |
| 2006/0095584 A1* | 5/2006 | Deolaliker et al. | 709/240 |
| 2007/0118744 A1* | 5/2007 | Huang | 713/168 |
| 2008/0160959 A1 | 7/2008 | Huang et al. | |
| 2011/0072101 A1* | 3/2011 | Forssell et al. | 709/206 |

FOREIGN PATENT DOCUMENTS

| | | |
|---|---|---|
| WO | 2007/142566 A1 | 12/2007 |
| WO | 2009/068945 A2 | 6/2009 |

OTHER PUBLICATIONS

"3rd Generation Partnership Project; Technical Specification Group Services and System Aspects; Generic Authentication Architecture (GAA); Generic bootstrapping architecture (Release 8)", 3GPP TS 33.220, v8.5.0, Dec. 2008, pp. 1-75.

"3rd Generation Partnership Project; Technical Specification Group Core Network and Terminals; Bootstrapping interface (Ub) and network application function interface (Ua); Protocol details (Release 8)", 3GPP TS 24.109, v8.0.0, Dec. 2008, pp. 1-64.

"ANDSF Service Authorization", 3GPP TSG-CT4 Meeting #43, Change Request TS 29.109, v8.0.0, Apr. 20-24, 2009, 21 pages.

Nokia et al., "Mutual Authentication for ANDSF Service and Roaming ME", 3GPP TSG-SA3 Meeting #55, Change Request 33.402, v8.3.1, May 11-15, 2009, 2 pages.

ZTE Corporation, "Update UE-ANDSF Communication Security Solution", 3GPP TSG-SA3 (Security), S3-090551, Meeting SA3 ad hoc, Change Request 33.402, Change Request 60, v8.3.1, Mar. 23-26, 2009, 4 pages.

Nokia et al., "ANDSF Roaming Authorization", 3GPP TSG CT WG4, Meeting #43, Agenda Item: SAE / LTE, Apr. 20-24, 2009, pp. 1-2.

"3rd Generation Partnership Project; Technical Specification Group Core Network and Terminals; Cx and Dx interfaces based on the Diameter protocol; Protocol details (Release 8)", 3GPP TS 29.229, v8.5.0, Mar. 2009, pp. 1-35.

International Search Report and Written Opinion received for corresponding Patent Cooperation Treaty Application No. PCT/IB2010/051881, dated Jul. 28, 2010, 13 pages.

Huawei, "Usage Control of the Service in Visited Network", 3GPP TSG-SA WG3 Security Meeting #35, S3-040746, Change Request 33.220 CR 022, v6.2.0, Oct. 5-8, 2004, pp. 1-11.

ZTE Corporation, "Delete the Requirement of Roaming", 3GPP T5G-SA WG3 Meeting S3#43, S3-060194, Change Request 33.220, v7.2.0, Apr. 4-7, 2006, pp. 1-7.

"3rd Generation Partnership Project; Technical Specification Group Services and System Aspects; Security aspects for inter-access mobility between non 3GPP and 3GPP access network (Release 8)", 3GPP TR 33.822, V8.0.0, Dec. 2008, pp. 1-30.

3GPP TSG-SA WG# Security Meeting #35, "Usage Control of the Service in Visited Network", Huawei, Oct. 2004.

* cited by examiner

SYSTEMS, METHODS, AND APPARATUSES FOR FACILITATING AUTHORIZATION OF A ROAMING MOBILE TERMINAL

RELATED APPLICATION

This application was originally filed as PCT Application No. PCT/IB2010/051881, filed Apr. 29, 2010, which claims priority benefit to U.S. Provisional Application No. 61/174,754, filed May 1, 2009.

TECHNOLOGICAL FIELD

Embodiments of the present invention relate generally to communication technology and, more particularly, relate to systems, methods, and apparatuses for facilitating authorization of a roaming mobile terminal.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer. Mobile terminals (also referred to as user equipment (UE) or user equipment devices) configured for accessing wireless networks of various types have enjoyed widespread adoption by consumers. In addition to using mobile terminals to access mobile networks, such as for communication purposes, consumers may also utilize mobile terminals to access other services that may be provided by a node of a network. Accessing network and/or accessing some other service provided by a node of the network may require authorization of a mobile terminal prior to grant of access to or usage of services. In this regard, a network entity may need to validate that the mobile terminal user is a valid subscriber of the network or service prior to granting access to a service.

BRIEF SUMMARY

Methods, apparatuses, and computer program products are herein provided for facilitating authorization of a roaming mobile terminal. In this regard, methods, apparatuses, and computer program products are provided that may provide several advantages to computing devices, computing device users, network operators, and network service providers. Some example embodiments provide for bootstrapping of security keys shared between mobile terminals and home networks for authorization of the mobile terminal when the mobile terminal is roaming on a visited network. In this regard, some example embodiments provide for transfer of security key related policy information (e.g., authorization policy information) from one or more nodes in the mobile terminal's home network to a service providing node on the visited network so that the service providing node may determine an authorization status of the mobile terminal and administer access to the requesting mobile terminal accordingly. Some example embodiments provide for the inclusion of detailed authorization policy information into a user security settings package and subsequent transfer of a modified user security settings package including the detailed authorization policy information to the service providing node on the visited network. The requested service may comprise access to the visited network or may comprise access to some other service. Some example embodiments provide for the transfer of a user security settings package including authorization policy information for a mobile terminal from a bootstrapping server functionality apparatus on the home network to a service providing node on the visited network. Some example embodiments limit impact on the bootstrapping server functionality apparatus incurred by transferring security key related policy information to a service providing node on the visited network by extending the Zn interface between the bootstrapping server functionality apparatus and a policy decisioning server on the home network such that the policy decisioning server is responsible for processing an authorization policy for the mobile terminal and modifying the user security settings package to include authorization policy information for transfer to the service providing node on the visited network. In some example embodiments, the policy decisioning server comprises an application server on the home network that stores the detailed authorization policy for a particular service and mobile terminal (e.g. for a user of the mobile terminal).

In a first example embodiment, a method is provided, which includes receiving, at a bootstrapping server functionality apparatus on a home network, a request for security key related policy information for a user equipment device. The request of this embodiment is sent by a service providing node on a visited network. The user equipment device of this embodiment is registered to the home network and is seeking to access a service of the visited network. The method of this embodiment additionally includes causing a service authorization information request including a user security settings package for the user equipment device to be sent to a policy decisioning server. The service authorization information request of this embodiment indicates a request that the policy decisioning server include authorization policy information for the user equipment device in the user security settings package. The method of this embodiment also includes receiving, in response to the service authorization information request, a service authorization information answer comprising a modified user security settings package including the authorization policy information for the user equipment device. The method of this embodiment further includes causing the requested security key related policy information to be sent to the service providing node based at least in part upon the received modified user security settings package.

In some embodiments, the request for security key information comprises a request for security key information corresponding to security key information provided by the user equipment device to the service providing node for use in authorization of the user equipment device by the service providing node in accordance with generic bootstrapping architecture authentication. In such embodiments, the user security settings package comprises generic bootstrapping architecture user security settings.

In some embodiments, the service providing node comprises a node configured to implement a visited access network discovery and selection function. In some embodiments, the policy decisioning server comprises an apparatus configured to implement a home access network discovery and selection function.

In some embodiments, the service authorization information request is sent and the service authorization information answer is received over a Zn interface. In some embodiments, causing the service authorization information request to be sent comprises causing the service authorization information request to be sent in accordance with diameter protocol and receiving the service authorization information answer comprises receiving the service authorization information answer in accordance with diameter protocol. In some embodiments, causing the service authorization information request to be sent comprises causing the service authorization information request to be sent in accordance with web services protocol and receiving the service authorization information answer comprises receiving the service authorization information answer in accordance with web services protocol.

In some embodiments, the method further includes using the modified user security settings package to generate the requested security key related policy information prior to causing the requested security key information to be sent to the service providing node.

In some embodiments, the method further includes causing the user security settings package for the user equipment device to be requested from a server storing the user security settings package. The server storing the user security settings package may, for example, comprise a home subscriber system and/or the like. In such embodiments, the method additionally includes receiving, in response to the request for the user security settings package, the user security settings package for the user equipment device. In such embodiments, the method may further include determining whether the received user security settings package includes a service specific authorization flag indicating the user security settings package has to be forwarded for processing to a policy decisioning server for the service to obtain authorization policy information. In such embodiments, causing a service authorization information request to be sent may comprise causing the service authorization information request to be sent when the received user security settings package includes a service specific authorization flag.

In another example embodiment, a computer program product is provided. The computer program product of this embodiment includes at least one computer-readable storage medium having computer-readable program instructions stored therein. The program instructions of this embodiment comprise program instructions configured to cause a bootstrapping server functionality apparatus on a home network to receive a request for security key related policy information for a user equipment device. The request of this embodiment is sent by a service providing node on a visited network. The user equipment device of this embodiment is registered to the home network and is seeking to access a service of the visited network. The program instructions of this embodiment further comprise program instructions configured to cause a service authorization information request including a user security settings package for the user equipment device to be sent to a policy decisioning server. The service authorization information request of this embodiment indicates a request that the policy decisioning server include authorization policy information for the user equipment device in the user security settings package. The program instructions of this embodiment additionally comprise program instructions configured to cause a service authorization information answer comprising a modified user security settings package including the authorization policy information for the user equipment device to be received in response to the service authorization information request. The program instructions of this embodiment additionally comprise program instructions configured to cause the requested security key related policy information to be sent to the service providing node based at least in part upon the received modified user security settings package.

In some embodiments, the request for security key related policy information comprises a request for security key information corresponding to security key information provided by the user equipment device to the service providing node for use in authorization of the user equipment device by the service providing node in accordance with generic bootstrapping architecture authentication. In such embodiments, the user security settings package comprises generic bootstrapping architecture user security settings.

In some embodiments, the service providing node comprises a node configured to implement a visited access network discovery and selection function. In some embodiments, the policy decisioning server comprises an apparatus configured to implement a home access network discovery and selection function.

In some embodiments, the service authorization information request is sent and the service authorization information answer is received over a Zn interface. In some embodiments, the program instructions configured to cause the service authorization information request to be sent comprise program instructions configured to cause the service authorization information request to be sent in accordance with diameter protocol and the program instructions configured to cause the service authorization information answer to be received comprise program instructions configured to cause the service authorization information answer to be received in accordance with diameter protocol. In some embodiments, the program instruction configured to cause the service authorization information request to be sent comprise program instructions configured to cause the service authorization information request to be sent in accordance with web services protocol and the program instructions configured to cause the service authorization information answer to be received comprise program instructions configured to cause the service authorization information answer to be received in accordance with web services protocol.

In some embodiments, the computer program product further includes program instructions configured to use the modified user security settings package to generate the requested security key related policy information prior to causing the requested security key information to be sent to the service providing node.

In some embodiments, the computer program product further includes program instructions configured to cause a request for the user security settings package to be sent to a server storing the user security settings package. The server storing the user security settings package may, for example, comprise a home subscriber system and/or the like. In such embodiments, the computer program product additionally includes program instructions configured to cause the user security settings package for the user equipment device to be received in response to the request for the user security settings package. In such embodiments, the computer program product may further include program instructions configured to determine whether the received user security settings package includes a service specific authorization flag indicating the user security settings package has to be forwarded for processing to a policy decisioning server for the service to obtain authorization policy information. In such embodiments, the program instructions configured to cause the service authorization information request to be sent may further comprise program instructions configured to cause the service authorization information request to be sent when the received user security settings package includes a service specific authorization flag.

In another example embodiment, an apparatus is provided. The apparatus of this embodiment comprises at least one processor and at least one memory storing computer program code, wherein the at least one memory and stored computer program code are configured, with the at least one processor, to cause the apparatus to at least receive a request for security key related policy information for a user equipment device. The apparatus of this embodiment resides on a home network. The request of this embodiment is sent by a service providing node on a visited network. The user equipment device of this embodiment is registered to the home network and is seeking to access a service of the visited network. The at least one memory and stored computer program code are configured, with the at least one processor, to further cause the apparatus of this embodiment to cause a service authorization information request including a user security settings package for the user equipment device to be sent to a policy decisioning server. The service authorization information request of this embodiment indicates a request that the policy decisioning server include authorization policy information for the user equipment device in the user security settings package. The at least one memory and stored computer program code are configured, with the at least one processor, to additionally cause the apparatus of this embodiment to receive, in response to the service authorization information request, a service authorization information answer comprising a modified user security settings package including the authorization policy information for the user equipment device. The at least one memory and stored computer program code are configured, with the at least one processor, to also cause the apparatus of this embodiment to cause the requested security key related policy information to be sent to the service providing node based at least in part upon the received modified user security settings package.

In some embodiments, the request for security key related policy information comprises a request for security key related policy information corresponding to security key information provided by the user equipment device to the service providing node for use in authorization of the user equipment device by the service providing node in accordance with generic bootstrapping architecture authentication. In such embodiments, the user security settings package comprises generic bootstrapping architecture user security settings.

In some embodiments, the service providing node comprises a node configured to implement a visited access network discovery and selection function. In some embodiments, the policy decisioning server comprises an apparatus configured to implement a home access network discovery and selection function.

In some embodiments, the at least one memory and stored computer program code are configured, with the at least one processor, to cause the apparatus to cause the service authorization information request to be sent and receive the service authorization information answer over a Zn interface. In some embodiments, the at least one memory and stored computer program code are configured, with the at least one processor, to cause the apparatus to cause the service authorization information request to be sent in accordance with diameter protocol and cause the apparatus to receive the service authorization information answer by receiving the service authorization information answer in accordance with diameter protocol. In some embodiments, the at least one memory and stored computer program code are configured, with the at least one processor, to cause the apparatus to cause the service authorization information request to be sent in accordance with web services protocol and to receive the service authorization information answer by receiving the service authorization information answer in accordance with web services protocol.

In some embodiments, the at least one memory and stored computer program code are configured, with the at least one processor, to cause the apparatus to use the modified user security settings package to generate the requested security key related policy information prior to sending the requested security key information to the service providing node.

In some embodiments, the at least one memory and stored computer program code are configured, with the at least one processor, to cause the apparatus to cause a request for the user security settings package to be sent to a server storing the user security settings package. The server storing the user security settings package may, for example, comprise a home subscriber system and/or the like. In such embodiments, the at least one memory and stored computer program code may be configured, with the at least one processor, to additionally cause the apparatus to receive, in response to the request for the user security settings package, the user security settings package for the user equipment device. The at least one memory and stored computer program code may be configured, with the at least one processor, to further cause the apparatus to determine whether the received user security settings package includes a service specific authorization flag indicating the user security settings package has to be forwarded for processing to a policy decisioning server for the service to obtain authorization policy information. The at least one memory and stored computer program code may be configured, with the at least one processor, to also cause the apparatus to cause a service authorization information request to be sent when the received user security settings package includes a service specific authorization flag.

In another example embodiment, an apparatus is provided, which includes means for receiving a request for security key related policy information for a user equipment device. The apparatus of this embodiment is configured to implement a bootstrapping server functionality and resides on a home network. The request of this embodiment is sent by a service providing node on a visited network. The user equipment device of this embodiment is registered to the home network and is seeking to access a service of the visited network. The apparatus of this embodiment additionally includes means for causing a service authorization information request including a user security settings package for the user equipment device to be sent to a policy decisioning server. The service authorization information request of this embodiment indicates a request that the policy decisioning server include authorization policy information for the user equipment device in the user security settings package. The apparatus of this embodiment also includes means for receiving, in response to the service authorization information request, a service authorization information answer comprising a modified user security settings package including the authorization policy information for the user equipment device. The apparatus of this embodiment further includes means for causing the requested security key related policy information to be sent to the service providing node based at least in part upon the received modified user security settings package.

In another example embodiment, a method is provided, which includes receiving, at a policy decisioning server on a home network, a service authorization information request including a user security settings package for a user equipment device registered to the home network and seeking to access a service of a visited network. The service authorization information request of this embodiment is sent by a bootstrapping server functionality apparatus on the home network. The method of this embodiment further includes processing an authorization policy for the user equipment device in response to receipt of the service information request. The method of this embodiment additionally includes modifying the user security settings package by adding authorization policy information for the user equipment device to the user security settings package. The method of this embodiment also includes causing a service authorization information answer comprising the modified user security settings package including the authorization policy information for the user equipment device to be sent to the bootstrapping server functionality apparatus.

In some embodiments, the authorization policy information is used by the bootstrapping server functionality apparatus to facilitate authorization of the user equipment device by a service providing node on the visited network in accordance with generic bootstrapping architecture authentication. In such embodiments, the user security settings package may comprise generic bootstrapping architecture user security settings.

In some embodiments, the policy decisioning server comprises an apparatus configured to implement a home access network discovery and selection function.

In some embodiments, receiving the service authorization information request comprises receiving the service authorization information request over a Zn interface and causing the service authorization information answer to be sent comprises causing the service authorization information answer to be sent over the Zn interface. In some embodiments, receiving the service authorization information request comprises receiving the service authorization information request in accordance with diameter protocol and causing the service authorization information answer to be sent comprises causing the service authorization information answer to be sent in accordance with diameter protocol. In some embodiments, receiving the service authorization information request comprises receiving the service authorization information request in accordance with web services protocol and causing the service authorization information answer to be sent comprises causing the service authorization information answer to be sent in accordance with web services protocol.

In some embodiments, the method further comprises determining the authorization policy for the user equipment device based at least in part upon an indication of a subscriber identity included in the user security settings package prior to processing the authorization policy.

In another example embodiment, a computer program product is provided. The computer program product of this embodiment includes at least one computer-readable storage medium having computer-readable program instructions stored therein. The program instructions of this embodiment comprise program instructions configured to cause a service authorization information request to be received, wherein the service authorization information request includes a user security settings package for a user equipment device registered to the home network and seeking to access a service of a visited network. The service authorization information request of this embodiment is sent by a bootstrapping server functionality apparatus on the home network. The program instructions of this embodiment further comprise program instructions configured to process an authorization policy for the user equipment device in response to receipt of the service information request. The program instructions of this embodiment additionally comprise program instructions configured to modify the user security settings package by adding authorization policy information for the user equipment device to the user security settings package. The program instructions of this embodiment also comprise program instructions configured to cause a service authorization information answer to be sent to the bootstrapping server functionality apparatus, wherein the service authorization information answer comprises the modified user security settings package including the authorization policy information for the user equipment device.

In some embodiments, the authorization policy information is used by the bootstrapping server functionality apparatus to facilitate authorization of the user equipment device by a service providing node on the visited network in accordance with generic bootstrapping architecture authentication. In such embodiments, the user security settings package may comprise generic bootstrapping architecture user security settings.

In some embodiments, the program instructions configured to cause the service authorization information request to be received comprise program instructions configured to cause the service authorization information request to be received over a Zn interface and the program instructions configured to cause the service authorization information answer to be sent comprise program instructions configured to cause the service authorization information answer to be sent over the Zn interface. In some embodiments, the program instructions configured to cause the service authorization information request to be received comprise program instructions configured to cause the service authorization information request to be received in accordance with diameter protocol and the program instructions configured to cause the service authorization information answer to be sent comprise program instructions configured to cause the service authorization information answer to be sent in accordance with diameter protocol. In some embodiments, the program instructions configured to cause the service authorization information request to be received comprise program instructions for causing the service authorization information request to be received in accordance with web services protocol and the program instructions configured to cause the service authorization information answer to be sent comprise program instructions configured to cause the service authorization information answer to be sent in accordance with web services protocol.

In some embodiments, the computer program product further comprises program instruction configured to determine the authorization policy for the user equipment device based at least in part upon an indication of a subscriber identity included in the user security settings package prior to processing the authorization policy.

In another example embodiment, an apparatus is provided. The apparatus of this embodiment comprises at least one processor and at least one memory storing computer program code, wherein the at least one memory and stored computer program code are configured, with the at least one processor, to cause the apparatus to at least receive a service authorization information request including a user security settings package for a user equipment device registered to a home network and seeking to access a service of a visited network. The service authorization information request of this embodiment is sent by a bootstrapping server functionality apparatus on the home network. The at least one memory and stored computer program code are configured, with the at least one processor, to further cause the apparatus of this embodiment to process an authorization policy for the user equipment device in response to receipt of the service information request. The at least one memory and stored computer program code are configured, with the at least one processor, to additionally cause the apparatus of this embodiment to modify the user security settings package by adding authorization policy information for the user equipment device to the user security settings package. The at least one memory and stored computer program code are configured, with the at least one processor, to also cause the apparatus of this embodiment to cause a service authorization information answer comprising the modified user security settings package including the authorization policy information for the user equipment device to be sent to the bootstrapping server functionality apparatus.

In some embodiments, the authorization policy information is used by the bootstrapping server functionality apparatus to facilitate authorization of the user equipment device by a service providing node on the visited network in accordance with generic bootstrapping architecture authentication. In such embodiments, the user security settings package may comprise generic bootstrapping architecture user security settings.

In some embodiments, the apparatus is configured to function as a policy decisioning server. The policy decisioning server may comprise a home access network discovery and selection function.

In some embodiments, the at least one memory and stored computer program code are configured, with the at least one processor, to cause the apparatus to receive the service authorization information request over a Zn interface and to cause the service authorization information answer to be sent over the Zn interface. In some embodiments, the at least one memory and stored computer program code are configured, with the at least one processor, to cause the apparatus to receive the service authorization information request in accordance with diameter protocol and to cause the service authorization information answer to be sent in accordance with diameter protocol. In some embodiments, the at least one memory and stored computer program code are configured, with the at least one processor, to cause the apparatus to receive the service authorization information request in accordance with web services protocol and to cause the service authorization information answer to be sent in accordance with web services protocol.

In some embodiments, the at least one memory and stored computer program code are configured, with the at least one processor, to further cause the apparatus to determine the authorization policy for the user equipment device based at least in part upon an indication of a subscriber identity included in the user security settings package prior to processing the authorization policy.

In another example embodiment, an apparatus is provided, which includes means for receiving a service authorization information request including a user security settings package for a user equipment device registered to the home network and seeking to access a service of a visited network. The service authorization information request of this embodiment is sent by a bootstrapping server functionality apparatus on the home network. The apparatus of this embodiment further includes means for processing an authorization policy for the user equipment device in response to receipt of the service information request. The apparatus of this embodiment additionally includes means for modifying the user security settings package by adding authorization policy information for the user equipment device to the user security settings package. The apparatus of this embodiment also includes means for causing a service authorization information answer comprising the modified user security settings package including the authorization policy information for the user equipment device to be sent to the bootstrapping server functionality apparatus.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described embodiments of the invention in general terms, reference will now be made to the accompanying drawings, which are not necessarily drawn to scale, and wherein:

Figure 1:
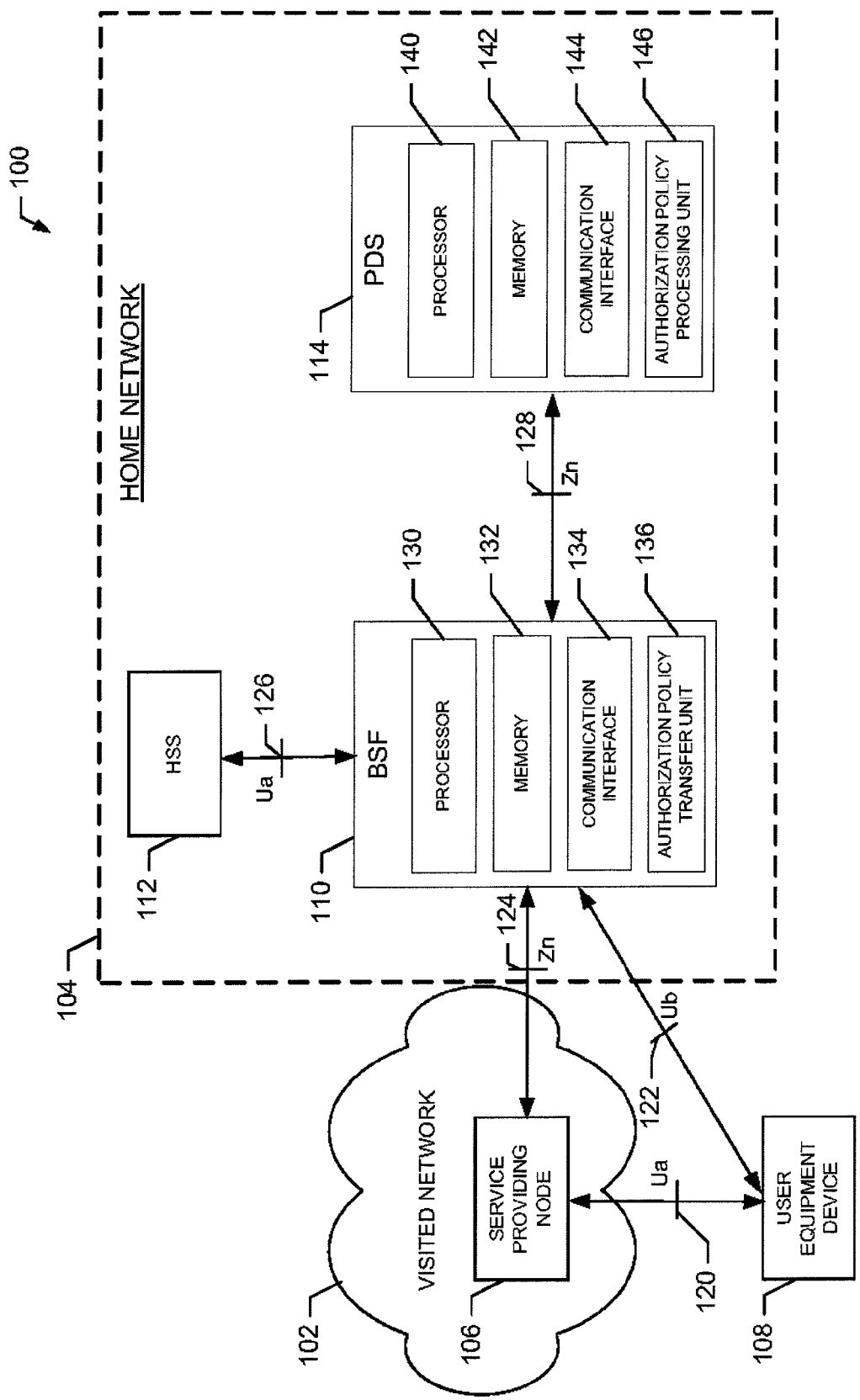
FIG. 1 illustrates a system for facilitating authorization of a roaming mobile terminal according to an example embodiment of the present invention.
Figure 3:
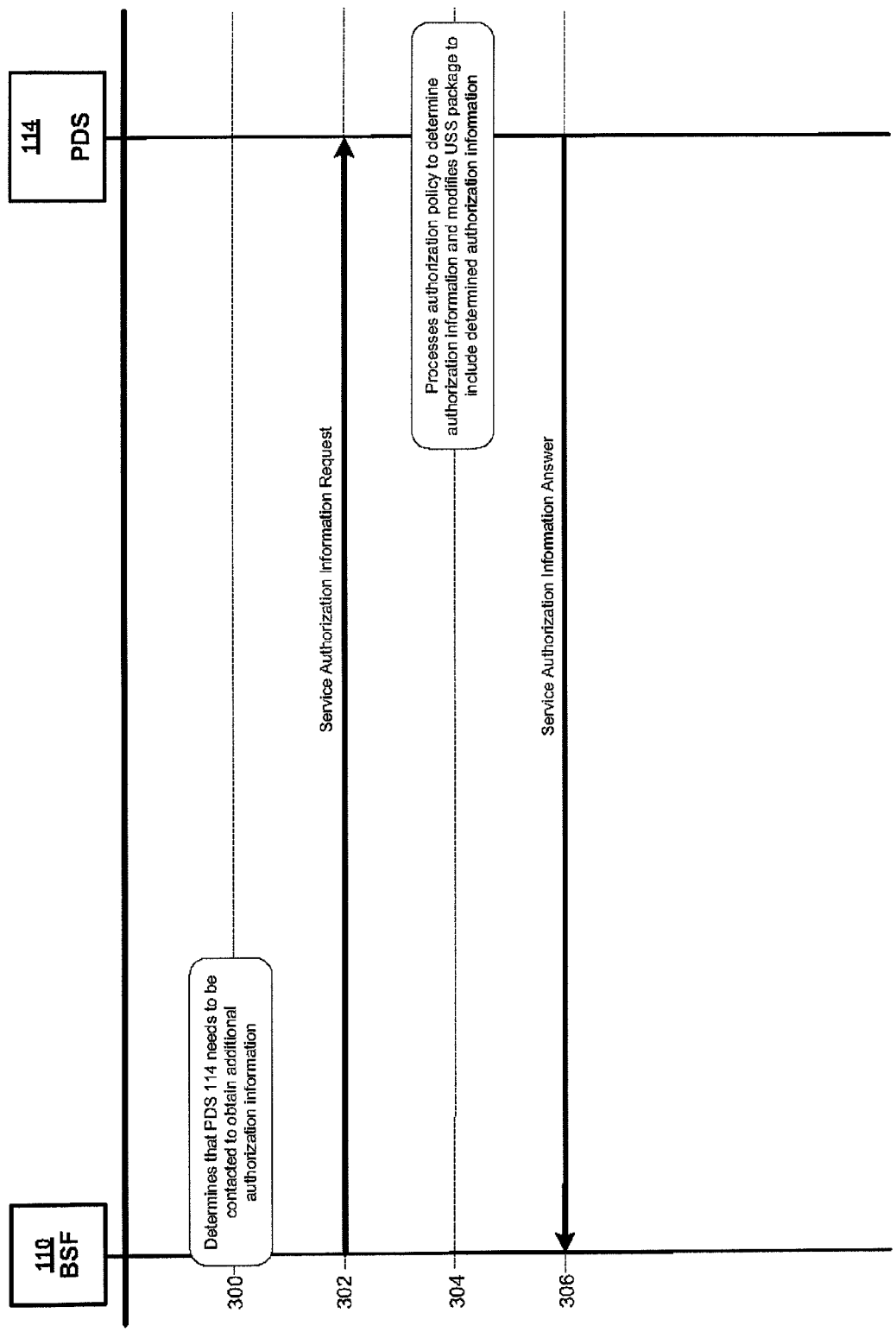
Figure 4:
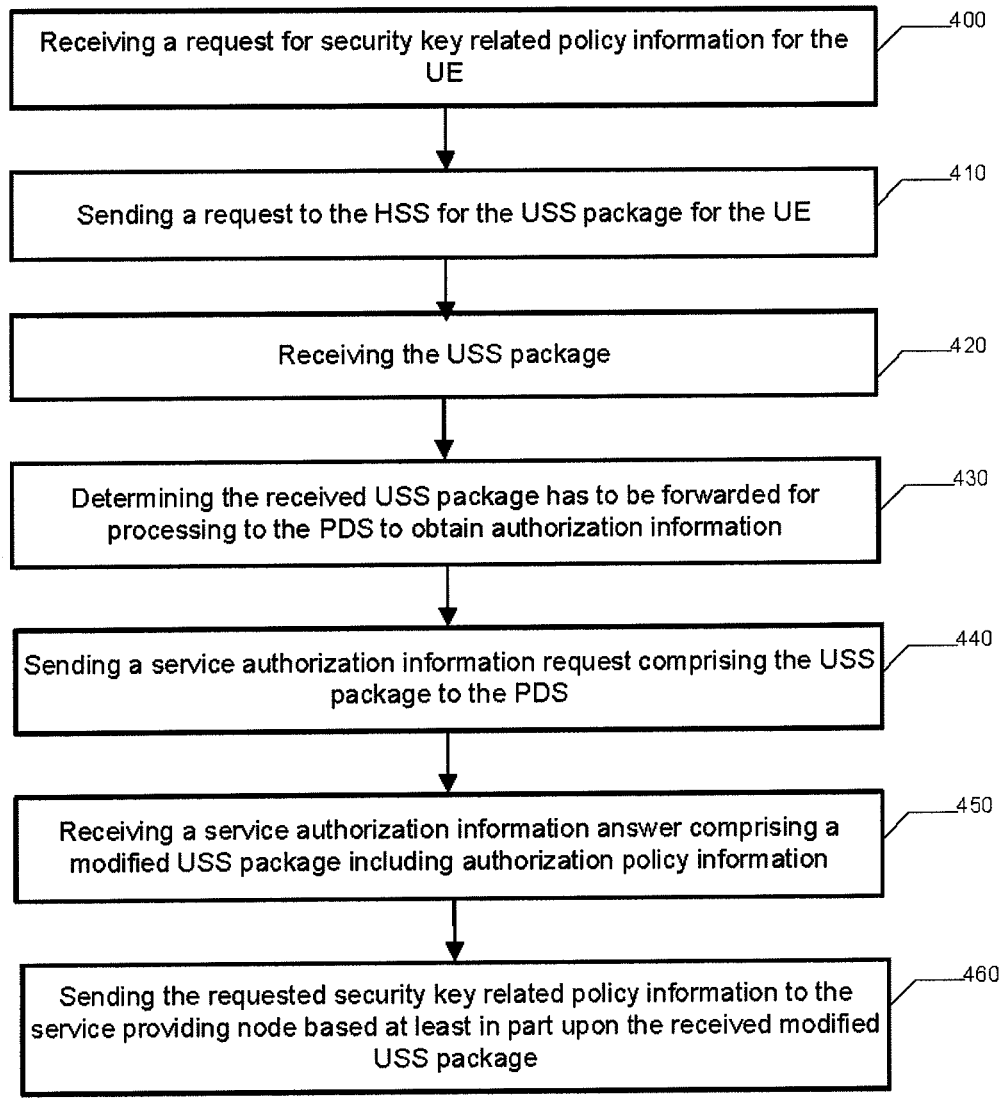
Figure 5:
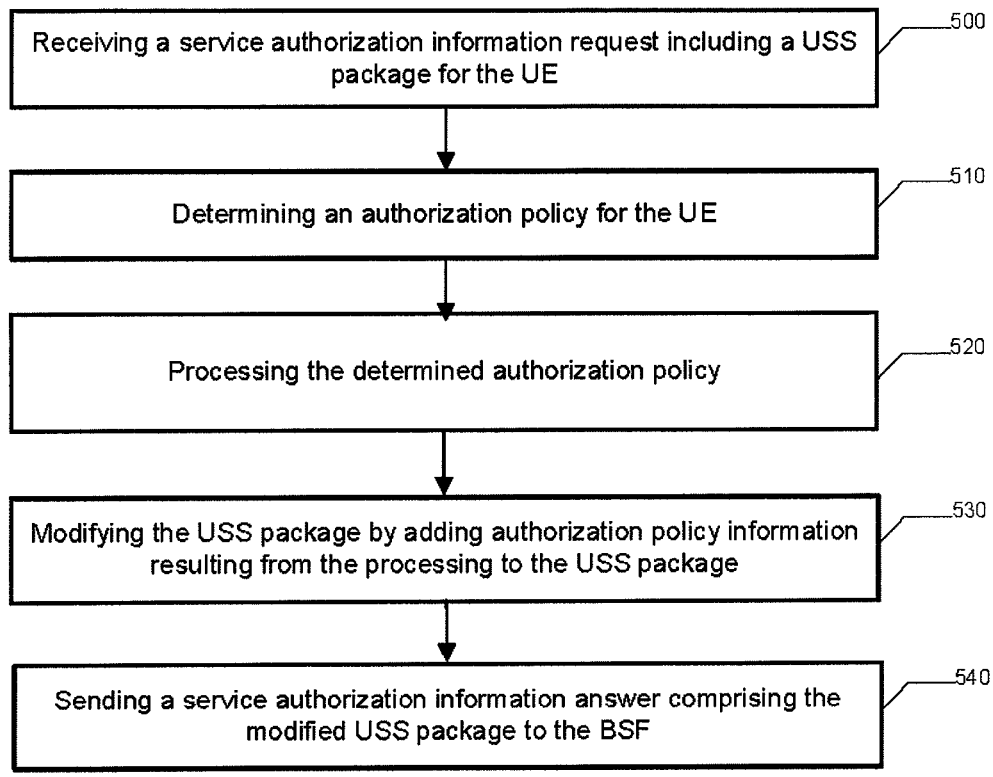

FIG. 3 illustrates a signaling diagram of signals that may be exchanged between entities of the system of FIG. 1 for facilitating authorization of a roaming mobile terminal according to example embodiments of the present invention; and FIGS. 4-5 illustrate flowcharts according to example methods for facilitating authorization of a roaming mobile terminal according to example embodiments of the invention.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

One means used by a network entity to authorize the service usage of a mobile terminal is to require the mobile terminal to bootstrap a security key shared between a mobile terminal and the mobile terminal's home network. The mobile terminal's home network may comprise a network with which the mobile terminal is registered, such as a network operated by a network operator to which the user of the mobile terminal has subscribed. Generic Bootstrapping Architecture (GBA) is an example of one framework architecture that allows bootstrapping of a security key shared between a mobile terminal and the home network, which can then be used to further derive security keys for use between the mobile terminal and a network application server. This security key shared between the mobile terminal and the home network is typically used to authenticate the mobile terminal and grant service authorization in the home network. However, to date, facilitating authorization of a roaming mobile terminal through bootstrapping has proven problematic, since the authorization policy may reside not in a central network node designed for roaming, but in a service specific node on the home network with no explicit roaming interfaces. Accordingly, when a mobile terminal is roaming and seeking access to a visited network or to another service provided by a node on the visited network, a network node on the visited network may not have access to the authorization policy for the mobile terminal.

Some example embodiments described herein accordingly provide systems, methods, apparatuses, and computer program products for facilitating authorization of a roaming mobile terminal. FIG. 1 illustrates a block diagram of a system 100 for facilitating authorization of a roaming mobile terminal according to an example embodiment of the present invention. It will be appreciated that the system 100 is provided as an example of one embodiment of the invention and should not be construed to narrow the scope or spirit of the invention in any way. It will be appreciated that the scope of the invention encompasses many potential embodiments in addition to those illustrated and described herein. As such, while FIG. 1 illustrates one example of a configuration of a system facilitating authorization of a roaming mobile terminal, numerous other configurations may also be used to implement embodiments of the present invention. Further, it will be appreciated that where references herein are made to specific types of communications networks (e.g., LTE) and specific terminology for system entities on a communications network, embodiments of the invention are applicable to communications networks not using standards of the referenced network(s) and to system entities performing similar functions to those described herein, but which are referred to using different terminology in accordance with other network standards.

Further, it will be appreciated that while reference herein is made to Generic Bootstrapping Architecture (GBA) and Generic Authentication Architecture (GAA), the reference is made as an example of one standard framework for bootstrapping of cellular authentication architecture for authorization of a mobile terminal that may be used in conjunction with embodiments of the invention to allow authorization of a roaming mobile terminal by a service providing node on a visited network in accordance with embodiments of the invention. Accordingly, it will be appreciated that example embodiments of the invention may also be used in conjunction with other such frameworks.

In at least some embodiments, the system 100 includes a visited network 102 and a home network 104. The visited network 102 and/or home network 104 may comprise packet switched public land mobile networks. In an example embodiment, the visited network 102 and/or home network 104 comprise networks operating in accordance with LTE standards.

The visited network 102 may comprise a service providing node 106, which is configured to provide access to a service to an authorized user equipment device 108. The service to which access is provided by the service providing node 106 may, for example, comprise access to the visited network 102 or any other service to which access may be provided by a node on the visited network 102. In some embodiments of the invention, the service providing node 106 comprises a network application function (NAF) which may, for example, comprise a visited access network discovery and selection function (ANDSF).

The home network 104 may comprise a bootstrapping server functionality apparatus (BSF) 110, a home subscriber system (HSS) 112, and a policy decisioning server (PDS) 114. Although not shown, the home network 104 may further include a home location register (HLR) or an authentication, authorization and accounting (AAA) server. AAA, HLR, and/or HSS may comprise databases which contain cryptographic information for access authorization and user identity information for user equipment devices 108 registered to the home network 104 and may, for example, store user security settings packages for user equipment devices 108 registered to the home network 108. Accordingly, wherever the term HSS is used hereinafter, the term should be seen as an example and replaceable by HLR, AAA, or by another database or apparatus storing such cryptographic information. The BSF 110 may comprise a server configured to allow the bootstrapping of a shared key(s) between a user equipment device (e.g., the user equipment device 108) and the BSF 110. In an example embodiment, the HSS 112 may store a complete set of a user's and/or user equipment device's 108 user security settings (USS), referred to herein as a USS package. In one embodiment, the USS package comprises GBA user security settings (GUSS). In some embodiments, the PDS 114 comprises a home ANDSF.

The system 100 may further comprise a user equipment device (UE) 108. The UE 108 may be registered to the home network 104. In this regard, a user of the UE 108 may subscribe to network access provided by an operator of the home network 104. The UE 108 may roam outside of an area of network access coverage provided by the home network 104 and into an area of network access coverage provided by the visited network 102. The UE 108 may be embodied as a desktop computer, laptop computer, mobile terminal, mobile computer, mobile phone, mobile communication device, game device, digital camera/camcorder, audio/video player, television device, radio receiver, digital video recorder, positioning device, any combination thereof, and/or the like that is configured to access the visited network 102 and home network 104. In some embodiments, the UE 108 is configured to access the visited network 102 and/or home network 104 in accordance with LTE standards. In an example embodiment, the UE 108 is embodied as a mobile terminal, such as that illustrated in FIG. 2.

Figure 2:
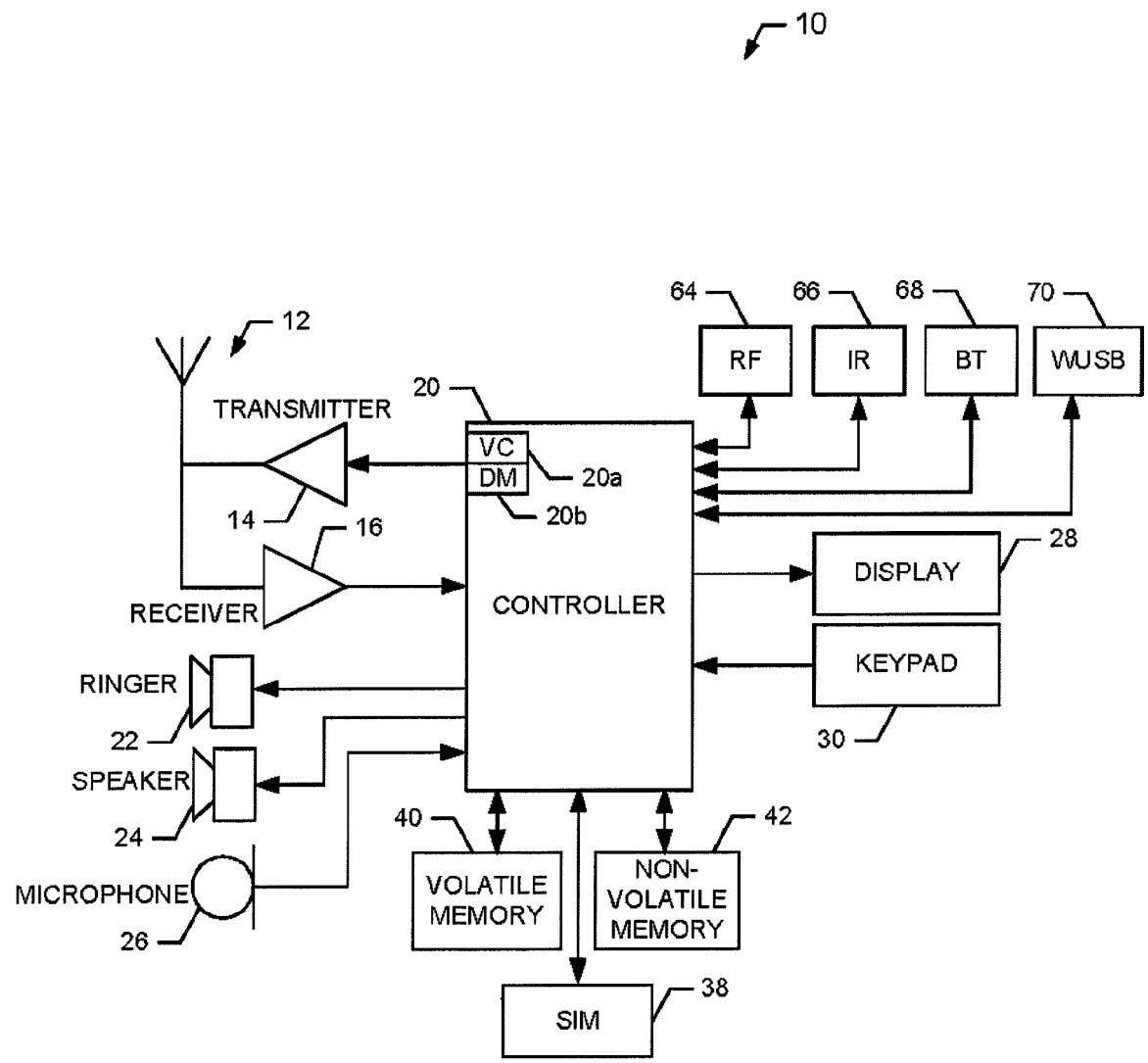
FIG. 2 is a schematic block diagram of a mobile terminal according to an example embodiment of the present invention.

In this regard, FIG. 2 illustrates a block diagram of a mobile terminal 10 representative of one embodiment of a UE 108 in accordance with embodiments of the present invention. It should be understood, however, that the mobile terminal 10 illustrated and hereinafter described is merely illustrative of one type of UE 108 that may implement and/or benefit from embodiments of the present invention and, therefore, should not be taken to limit the scope of the present invention. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ embodiments of the present invention.

As shown, the mobile terminal 10 may include an antenna 12 (or multiple antennas 12) in communication with a transmitter 14 and a receiver 16. The mobile terminal may also include a controller 20 or other processor(s) that provides signals to and receives signals from the transmitter and receiver, respectively. These signals may include signaling information in accordance with an air interface standard of an applicable cellular system, and/or any number of different wireline or wireless networking techniques, comprising but not limited to Wireless-Fidelity (Wi-Fi), wireless local access network (WLAN) techniques such as Institute of Electrical and Electronics Engineers (IEEE) 802.11, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wireless Fidelity (Wi-Fi) or Worldwide Interoperability for Microwave Access (WiMAX) protocols.

It is understood that the controller 20 may comprise circuitry for implementing audio/video and logic functions of the mobile terminal 10. For example, the controller 20 may comprise a digital signal processor device, a microprocessor device, an analog-to-digital converter, a digital-to-analog converter, and/or the like. Control and signal processing functions of the mobile terminal may be allocated between these devices according to their respective capabilities. The controller may additionally comprise an internal voice coder (VC) 20a, an internal data modem (DM) 20b, and/or the like. Further, the controller may comprise functionality to operate one or more software programs, which may be stored in memory. For example, the controller 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the controller 20. Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to ultra-low power Bluetooth™ technology (e.g., Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wireless Fidelity (Wi-Fi), WLAN techniques such as IEEE 802.11 techniques, and/or the like.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning to FIG. 1, communication between various entities in the system 100 is established via interfaces. For example, the UE 108 may communicate with the service providing node 106 via a first interface (Ua) 120 (e.g., via internet protocol, hypertext transfer protocol digest, and/or the like). The UE 108 may communicate with the BSF 110 via a second interface (Ub) 122 (e.g., via authentication and key agreement (AKA) protocol). The service providing node 106 may communicate with the BSF 110 via a third interface (Zn) 124 (e.g., via DIAMETER or web service protocol). The BSF 110 may communicate with the HSS 112 (and/or the HLR and AAA server, if applicable) via a fourth interface (Zh) 126 (e.g., via the DIAMETER, RADIUS or Message Application Protocol (MAP) protocol). The BSF 110 may communicate with the PDS 114 via the Zn interface 128 (e.g., via DIAMETER or web service protocol). It will be appreciated that although not illustrated in FIG. 1, one or more of the Ua interface 120, Ub interface 122, Zn interface 124, Zh interface 126, or Zn interface 128 may comprise one or more proxy or other intermediate nodes configured to forward data sent over the respective interface.

In an example embodiment, the BSF 110 includes various means, such as one or more of a processor 130, memory 132, communication interface 134, or an authorization policy transfer unit 136 for performing the various functions herein described. These means of the BSF 110 as described herein may be embodied as, for example, hardware elements (e.g., a suitably programmed processor, combinational logic circuit, and/or the like), a computer program product comprising computer-readable program instructions (e.g., software or firmware) stored on a computer-readable medium (e.g. memory 132) that is executable by a suitably configured processing device (e.g., the processor 130), or some combination thereof.

The processor 130 may, for example, be embodied as various means including one or more microprocessors with accompanying digital signal processor(s), one or more processor(s) without an accompanying digital signal processor, one or more coprocessors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 1 as a single processor, in some embodiments the processor 130 comprises a plurality of processors. The plurality of processors may be in operative communication with each other and may be collectively configured to perform one or more functionalities of the BSF 110 as described herein. The plurality of processors may be embodied on a single computing device or on a plurality of computing devices, which may be collectively configured to function as a BSF 110. In an example embodiment, the processor 130 is configured to execute instructions stored in the memory 132 or otherwise accessible to the processor 130. These instructions, when executed by the processor 130, may cause the BSF 110 to perform one or more of the functionalities of the BSF 110 as described herein. As such, whether configured by hardware or software methods, or by a combination thereof, the processor 130 may comprise an entity capable of performing operations according to embodiments of the present invention while configured accordingly. Thus, for example, when the processor 130 is embodied as an ASIC, FPGA or the like, the processor 130 may comprise specifically configured hardware for conducting one or more operations described herein. Alternatively, as another example, when the processor 130 is embodied as an executor of instructions, the instructions may specifically configure the processor 130 to perform one or more algorithms and operations described herein.

The memory 132 may include, for example, volatile and/or non-volatile memory. Although illustrated in FIG. 1 as a single memory, the memory 132 may comprise a plurality of memories. The memory 132 may comprise volatile memory, non-volatile memory, or some combination thereof. In this regard, the memory 132 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. The memory 132 may be configured to store information, data, applications, instructions, or the like for enabling the BSF 110 to carry out various functions in accordance with example embodiments of the present invention. For example, in at least some embodiments, the memory 132 is configured to buffer input data for processing by the processor 130. Additionally or alternatively, in at least some embodiments, the memory 132 is configured to store program instructions for execution by the processor 130. The memory 132 may store information in the form of static and/or dynamic information. This stored information may be stored and/or used by the authorization policy transfer unit 136 during the course of performing its functionalities.

The communication interface 134 may be embodied as any device or means embodied in hardware, a computer program product comprising computer readable program instructions stored on a computer readable medium (e.g., the memory 132) and executed by a processing device (e.g., the processor 130), or a combination thereof that is configured to receive and/or transmit data from/to a remote entity of the system 100. In this regard, the communication interface 134 may be configured to communicate with the service providing node 106 over the Zn interface 124, with the user equipment device 108 over the Ub interface 122, with the HSS 112 over the Zh interface 126, and/or with the PDS 114 over the Zn interface 128. In at least one embodiment, the communication interface 134 is at least partially embodied as or otherwise controlled by the processor 130. In this regard, the communication interface 134 may be in communication with the processor 130, such as via a bus. The communication interface 134 may include, for example, an antenna, a transmitter, a receiver, a transceiver and/or supporting hardware or software for enabling communications with other entities of the system 100. The communication interface 134 may be configured to receive and/or transmit data using any protocol that may be used for communications between entities of the system 100. The communication interface 134 may additionally be in communication with the memory 132 and/or authorization policy transfer unit 136, such as via a bus.

The authorization policy transfer unit 136 may be embodied as various means, such as hardware, a computer program product comprising computer readable program instructions stored on a computer readable medium (e.g., the memory 132) and executed by a processing device (e.g., the processor 130), or some combination thereof and, in one embodiment, is embodied as or otherwise controlled by the processor 130. In embodiments wherein the authorization policy transfer unit 136 is embodied separately from the processor 130, the authorization policy transfer unit 136 may be in communication with the processor 130. The authorization policy transfer unit 136 may further be in communication with the memory 132 and/or communication interface 134, such as via a bus.

In an example embodiment, the PDS 114 includes various means, such as one or more of a processor 140, memory 142, communication interface 144, or authorization policy processing unit 146 for performing the various functions herein described. These means of the PDS 114 as described herein may be embodied as, for example, hardware elements (e.g., a suitably programmed processor, combinational logic circuit, and/or the like), a computer program product comprising computer-readable program instructions (e.g., software or firmware) stored on a computer-readable medium (e.g. memory 142) that is executable by a suitably configured processing device (e.g., the processor 140), or some combination thereof.

The processor 140 may, for example, be embodied as various means including one or more microprocessors with accompanying digital signal processor(s), one or more processor(s) without an accompanying digital signal processor, one or more coprocessors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 1 as a single processor, in some embodiments the processor 140 comprises a plurality of processors. The plurality of processors may be embodied on a single computing device or distributed among a plurality of computing devices, which may be collectively configured to function as a PDS 114. The plurality of processors may be in operative communication with each other and may be collectively configured to perform one or more functionalities of the PDS 114 as described herein. In an example embodiment, the processor 140 is configured to execute instructions stored in the memory 142 or otherwise accessible to the processor 140. These instructions, when executed by the processor 140, may cause the PDS 114 to perform one or more of the functionalities of the PDS 114 as described herein. As such, whether configured by hardware or software methods, or by a combination thereof, the processor 140 may comprise an entity capable of performing operations according to embodiments of the present invention while configured accordingly. Thus, for example, when the processor 140 is embodied as an ASIC, FPGA or the like, the processor 140 may comprise specifically configured hardware for conducting one or more operations described herein. Alternatively, as another example, when the processor 140 is embodied as an executor of instructions, the instructions may specifically configure the processor 140 to perform one or more algorithms and operations described herein.

The memory 142 may include, for example, volatile and/or non-volatile memory. Although illustrated in FIG. 1 as a single memory, the memory 142 may comprise a plurality of memories. The memory 142 may comprise volatile memory, non-volatile memory, or some combination thereof. In this regard, the memory 142 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. The memory 142 may be configured to store information, data, applications, instructions, or the like for enabling the PDS 114 to carry out various functions in accordance with example embodiments of the present invention. For example, in at least some embodiments, the memory 142 is configured to buffer input data for processing by the processor 140. Additionally or alternatively, in at least some embodiments, the memory 142 is configured to store program instructions for execution by the processor 140. The memory 142 may store information in the form of static and/or dynamic information. This stored information may be stored and/or used by the authorization policy processing unit 146 during the course of performing its functionalities.

The communication interface 144 may be embodied as any device or means embodied in hardware, a computer program product comprising computer readable program instructions stored on a computer readable medium (e.g., the memory 142) and executed by a processing device (e.g., the processor 140), or a combination thereof that is configured to receive and/or transmit data from/to a remote entity of the system 100. In this regard, the communication interface 144 may be configured to communicate with the BSF 110 over the Zn interface 128. In at least one embodiment, the communication interface 144 is at least partially embodied as or otherwise controlled by the processor 140. In this regard, the communication interface 144 may be in communication with the processor 140, such as via a bus. The communication interface 144 may include, for example, an antenna, a transmitter, a receiver, a transceiver and/or supporting hardware or software for enabling communications with other entities of the system 100. The communication interface 144 may be configured to receive and/or transmit data using any protocol that may be used for communications between computing entities of the system 100. The communication interface 144 may additionally be in communication with the memory 142 and/or authorization policy processing unit 146, such as via a bus.

The authorization policy processing unit 146 may be embodied as various means, such as hardware, a computer program product comprising computer readable program instructions stored on a computer readable medium (e.g., the memory 142) and executed by a processing device (e.g., the processor 140), or some combination thereof and, in one embodiment, is embodied as or otherwise controlled by the processor 140. In embodiments wherein the authorization policy processing unit 146 is embodied separately from the processor 140, the authorization policy processing unit 146 may be in communication with the processor 140. The authorization policy processing unit 146 may further be in communication with the memory 142 and/or communication interface 144, such as via a bus.

The UE 108 may be configured to initiate an authorization process by sending a request to access a service accessible through the service providing node 106 via the Ua interface 120. In embodiments wherein the service providing node 106 is embodied as a visited ANDSF, the UE 108 may request access to the visited network 102. The request may comprise sufficient information to enable the service providing node 106 to retrieve keys for authorizing the UE 108 and/or to protect the protocol Ua. The information provided by the UE 108 may, for example, comprise a Bootstrapping Transaction Identifier (B-TID). In one embodiment, the information provided by the UE 108 is provided in accordance with GBA authentication framework standards.

In response to receipt of the request from the UE 108, the service providing node 106 may initiate protocol Zn with the BSF 110 over the Zn interface 124 and send a request to the BSF 110 for security key related policy information. In this regard, the service providing node 106 may send a request for security keys, key material (e.g., key lifetime and/or the like), user security settings, policy information, and/or the like. The requested security key related policy information may be specific to the service providing node 106 (e.g., key related information specific to the requested service) and may correspond to security key information provided to the service providing node 106 by the UE 108 upon initiation of protocol Ua (e.g., the B-TID).

The authorization policy transfer unit 136 may be configured to receive a request for security key related policy information over the Zn interface 124 that is sent by the service providing node 106. In response to receipt of a request for security key related policy information, the authorization policy transfer unit 136 may be configured to send a request for the authentication vector (AV) and/or USS package for the UE 108 to the HSS 112 over the Zh interface 126. The HSS 112 may then send the requested authentication vector and/or USS package to the BSF 110, where it may be received by the authorization policy transfer unit 136. In one embodiment, the USS package comprises a GUSS package. The authorization policy transfer unit 136 may be configured to determine whether a received USS package includes a service specific authorization flag indicating the USS package has to be forwarded for processing to the PDS 114 to obtain additional authorization information. When the authorization policy transfer unit 136 determines that the received USS package includes a service specific authorization flag, the authorization policy transfer unit 136 may send a service authorization information request comprising the USS package to the PDS 114. The service authorization information request indicates a request for the PDS 114 to include authorization policy information for the UE 108, for the service providing node 106, and/or for the service which the UE 108 has requested to access in the USS package. In embodiments wherein the service providing node 106 comprises a NAF, the service authorization information request may indicate a request for the PDS 114 to include authorization policy information for the NAF.

In some embodiments, the authorization policy transfer unit 136 is configured to send a service authorization information request in accordance with DIAMETER protocol. In one embodiment wherein the authorization policy transfer unit 136 is configured to send a service authorization information request in accordance with DIAMETER protocol, the service authorization information request has the following example format, wherein the content of the message is specified in the same format as in 3GPP TS 29.229. In this regard, the curly brackets of the example format indicate mandatory attribute-value-pairs (AVPs) and the square brackets of the example format indicate optional AVPs. The address referred to in the example format refers to the Fully Qualified Host Name (FQDN).

```
< ServiceAuthorization-Info-Request> ::=<Diameter Header: 310,
    REQ, PXY, 16777220 >
    < Session-Id >
    { Vendor-Specific-Application-Id }
    { Origin-Host }                  ; Address of BSF
    { Origin-Realm }                 ; Realm of BSF
    { Destination-Realm }            ; Realm of PDS
    [ Destination-Host ]             ; Address of the PDS
    * [ GAA-Service-Identifier ]     ; Service identifiers
    { Transaction-Identifier }       ; B-TID
    * [ User-Name ]                  ; IMPI
    { GBA-UserSecSettings }          ; Selected USSs
    { NAF-Id }                       ; NAF_ID of service
    providing node
    *[ AVP ]
    *[ Proxy-Info ]
    *[ Route-Record ]
```

The content of Vendor-Specific-Application-ID of this embodiment is:

```
<Vendor-Specific-Application-Id>::=<AVP header: 260>
    1* [Vendor-Id]              ; 3GPP is 10415
    0*1 {Auth-Application-Id}   ; 16777220
    0*1 {Acct-Application-Id}   ; Omitted
```

The Destination-Realm AVP in the service authorization information request of this embodiment is set to subscriber's PDS. The address of the PDS 114 is known to the BSF 110 for the corresponding service.

In some embodiments, the authorization policy transfer unit 136 is configured to send a service authorization information request in accordance with web services protocol. In one embodiment wherein the authorization policy transfer unit 136 is configured to send a service authorization information request in accordance with web services protocol, the service authorization information request has the following example format, wherein the schema of the message content is specified in the same format as in Web Service Definition Language (WSDL).

```
<xsd:element name="requestServiceAuthorizationInfoRequest">
    <xsd:complexType>
        <xsd:sequence>
            <xsd:element name="impi" type="xsd:string" minOccurs="0"/>
            <xsd:element name="btid" type="xsd:string"/>
            <xsd:element name="nafid" type="xsd:base64Binary"/>
            <xsd:element name="ussList" type="xsd:string" minOccurs="1"/>
            <xsd:element name="gsid" type="xsd:string" minOccurs="1"
                maxOccurs="unbounded"/>
            <xsd:element name="extension" type=" typens:tExtension"
                minOccurs="0"/>
        </xsd:sequence>
    </xsd:complexType>
</xsd:element>
```

The simple object access protocol (SOAP) message sent to PDS 114, e.g., the uniform resource identifier (URI) of the message of this embodiment contains the PDS 114 address configured in the BSF 110.
The "nafid" of this embodiment comprises an identification of the service providing node 106.

The authorization policy processing unit 146 is configured in an example embodiment to receive a service authorization information request sent by the BSF 110 and including a USS package for the UE 108. The service authorization information request may be sent by the BSF 110. The authorization policy processing unit 146 may be configured to receive the service authorization information request over the Zn interface 128. The service authorization information request may comprise a user identifier associated with the UE 108. The user identifier in one embodiment comprises the Internet Protocol Multimedia Private Identifier (IMPI), such as may be included in the User-Name field of a service authorization information request formatted and sent in accordance with DIAMETER protocol. Additionally or alternatively, the user identifier in one embodiment comprises the Internet Protocol Multimedia Public Identity (IMPU). Based at least in part upon the user identifier included in a received service authorization information request, the authorization policy processing unit 146 may be configured to access authorization policies stored in the memory 142 to determine the authorization policy associated with the UE 108, with the service providing node 106, and/or with the service requested by the UE 108 and then retrieve the determined authorization policy.

The authorization policy processing unit 146 is configured in at least some embodiments of the invention to process a retrieved authorization policy. The authorization policy processing unit 146 may process an authorization policy according to local roaming policy. The authorization policy processing unit 146 may be configured to modify the USS package received in the service authorization information request message by adding authorization policy information resulting from processing the authorization policy to the USS package. The authorization policy processing unit 146 may be further configured to generate a service authorization information answer comprising the modified USS package and send the service authorization information answer to the BSF 110, such as via the Zn interface 128.

In some embodiments, the authorization policy processing unit 146 is configured to send a service authorization information answer in accordance with DIAMETER protocol. In one embodiment wherein the authorization policy processing unit 146 is configured to send a service authorization information answer in accordance with DIAMETER protocol, the service authorization information answer has the following example format, wherein the content of the message is specified in the same format as in 3GPP TS 29.229. In this regard, the curly brackets of the example format indicate mandatory AVPs and the square brackets of the example format indicate optional AVPs. The address referred to in the example format refers to the Fully Qualified Host Name (FQDN).

```
< ServiceAuthorization-Info-Answer> ::= < Diameter Header: 310, PXY,
16777220 >
    < Session-Id >
    { Vendor-Specific-Application-Id }
    [ Result-Code ]
    [ Experimental-Result]
    { Origin-Host }                      ; Address of PDS
    { Origin-Realm }                     ; Realm of PDS
    { Destination-Realm }                ; Realm of BSF
    [ Destination-Host ]                 ; Address of the BSF
    *[ User-Name ]                       ; IMPI
    { Transaction-Identifier }           ; B-TID
    { GBA-UserSecSettings }              ; Selected USSs
    *[ AVP ]
    *[ Proxy-Info ]
    *[ Route-Record ]
```

In some embodiments, the authorization policy processing unit 146 is configured to send a service authorization information answer in accordance with web services protocol. In one embodiment wherein the authorization policy transfer unit 146 is configured to send a service authorization information answer in accordance with web services protocol, the service authorization information answer has the following example format, wherein the schema of the message content is specified in the same format as in Web Service Definition Language (WSDL).

```
<xsd:element name="requestServiceAuthorziationInfoResponse">
  <xsd:complexType>
    <xsd:sequence>
      <xsd:element name="impi" type="xsd:string" minOccurs="0"/>
        <xsd:element name="btid" type="xsd:string"/>
      <xsd:element name="ussList" type="xsd:string" minOccurs="1"/>
        <xsd:element name="nafid" type="xsd:base64Binary"/>
      <xsd:element name="extension" type=" typens:tExtension"
      minOccurs="0"/>
    </xsd:sequence>
  </xsd:complexType>
</xsd:element>
```
The "impi" element may be optional.
The "btid" element of this embodiment contains the bootstrapping transaction identifier.
The "nafid" element may contain the identity of the service providing node 106.
The "ussList" element of this embodiment contains the modified USSS package.
One or more "extension" elements including additional data may also be included in the service authorization information answer.

The authorization policy transfer unit 136 is configured in one embodiment of the invention to receive a service authorization information answer sent by the PDS 114. In response to receipt of a service authorization information answer, the authorization policy transfer unit 136 may be configured to extract the modified USS package from the service authorization information answer. The modified USS package may comprise at least some of the security key related policy information requested by the service providing node 106. In one embodiment, the authorization policy transfer unit 136 is configured to generate at least some of the requested security key related policy information based at least in part upon the modified USS package. The authorization policy transfer unit 136 may be configured to send the requested security key related policy information to the service providing node 106, which may then authenticate the UE 108 based at least in part upon the requested security key information. In addition to the security key related policy information, the authorization policy transfer unit 136 may additionally send one or more security keys associated with the security key related policy information to the service providing node 106.

In an alternative embodiment, the authorization policy transfer unit 136 is configured to send a service authorization policy information request to the PDS 114 that does not comprise the USS package. In this alternative embodiment, the authorization policy processing unit 146 is configured to respond by determining an authorization policy for the UE 108 and sending the authorization policy to the BSF 110 without processing the authorization policy. The authorization policy transfer unit 136 is configured in this alternative embodiment to process the authorization policy and modify the USS package to include authorization policy information resulting from processing the authorization policy.

In another alternative embodiment, the authorization policy processing unit 114 is configured to synchronize authorization policy data stored in the memory 142 with the HSS 112 such that the HSS 112 stores authorization policies copied from the PDS 114. When the authorization policy transfer unit 136 sends a request to the HSS 114 for the USS package for the UE 108 in this alternative embodiment, the HSS 114 may also provide the appropriate authorization policy to the BSF 110. In this alternative embodiment, the authorization policy transfer unit 136 may be configured to process the authorization policy provided by the HSS 114 and modify the USS package to include authorization policy information resulting from processing the authorization policy. Alternatively, in this alternative embodiment, the authorization policy transfer unit 136 may be configured to forward the authorization policy and USS package to the service providing node 106, which may then process and enforce the authorization policy.

FIG. 3 illustrates a signaling diagram of signals that may be exchanged between the BSF 110 and PDS 114 for facilitating authorization of a roaming mobile terminal according to example embodiments of the present invention. Operation 300 may comprise the authorization policy transfer unit 136 determining that the PDS 114 needs to be contacted to obtain additional authorization information (e.g., authorization information in addition to that contained in a USS package for the UE 108). Operation 302 may comprise the authorization policy transfer unit 136 sending a service authorization information request comprising the USS package to the PDS 114. The authorization policy processing unit 146 may receive the service authorization information request and determine an authentication policy based at least in part upon a user identifier included in the service authorization information request. The authorization policy processing unit 146 may process the determined authorization policy to determine the additional authorization information and modify the USS package to include the additional authorization information resulting from the processing, at operation 304. Operation 306 may comprise the authorization policy processing unit 146 sending a service authorization information answer including the modified USS package to the BSF 110.

FIG. 4 illustrates a flowchart according to an example method for facilitating authorization of a roaming mobile terminal according to an example embodiment of the invention. In this regard, FIG. 4 illustrates operations that may occur at the BSF 110. The method may include the authorization policy transfer unit 136 receiving a request for security key related policy information for the UE, at operation 400. Operation 410 may comprise the authorization policy transfer unit 136 sending a request to the HSS 112 for the USS package for the UE 108. The authorization policy transfer unit 136 may receive the USS in response to the request sent to the HSS 112, at operation 420. Operation 430 may comprise the authorization policy transfer unit 136 determining the received USS package has to be forwarded for processing to the PDS 114 to obtain authorization policy information. The authorization policy transfer unit 136 may send a service authorization information request comprising the USS package to the PDS 114, at operation 440. Operation 450 may comprise the authorization policy transfer unit 136 receiving a service authorization information answer comprising a modified USS package including authorization policy information. The authorization policy transfer unit 136 may send the requested security key related policy information to the service providing node 106, at operation 460. The security key related policy information may be selected and/or generated based at least in part upon the received modified USS package.

FIG. 5 illustrates a flowchart according to an example method for facilitating authorization of a roaming mobile terminal according to an example embodiment of the invention. In this regard, FIG. 5 illustrates operations that may occur at the PDS 114. The method may include the authorization policy processing unit 146 receiving a service authorization information request including a USS package for the UE 108, at operation 500. Operation 510 may comprise the authorization policy processing unit 146 determining an authorization policy for the UE. The authorization policy processing unit 146 may determine the authorization policy based at least in part upon a user identifier included in the service authorization information request. Operation 520 may comprise the authorization policy processing unit 146 processing the determined authorization policy. The authorization policy processing unit 146 may modify the USS package by adding authorization policy information resulting from the processing to the USS package, at operation 530. Operation 540 may comprise the authorization policy processing unit 146 sending a service authorization information answer comprising the modified USS package to the BSF 110.

FIGS. 4-5 are flowcharts of a system, method, and computer program product according to example embodiments of the invention. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by a computer program product comprising computer program instructions. In this regard, the computer program product(s) which embody the procedures described herein may be stored by one or more memory devices of a mobile terminal, server, or other computing device and executed by a processor in the computing device. In some embodiments, the computer program instructions comprising the computer program product(s) which embody the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions and combinations of operations for performing the specified functions. It will also be understood that one or more blocks of the flowcharts, and combinations of blocks in the flowcharts, may be implemented by special purpose hardware-based computer systems which perform the specified functions or steps, or combinations of special purpose hardware and computer program product(s).

The above described functions may be carried out in many ways. For example, any suitable means for carrying out each of the functions described above may be employed to carry out example embodiments. In one embodiment, a suitably configured processor may provide all or a portion of the elements. In another embodiment, all or a portion of the elements may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

As such, then, some embodiments of the invention provide several advantages to computing devices, computing device users, network operators, and network service providers. Some example embodiments provide for bootstrapping of security keys shared between mobile terminals and home networks for authorization of the mobile terminal when the mobile terminal is roaming on a visited network. In this regard, some example embodiments of the invention provide for transfer of security key related policy information (e.g., authorization policy information) from one or more nodes in the mobile terminal's home network to a service providing node on the visited network so that the service providing node may determine an authorization status of the mobile terminal and administer access to the requesting mobile terminal accordingly. The requested service may comprise access to the visited network or may comprise access to some other service. Some example embodiments provide for the transfer of a user security settings package including authorization policy information for a mobile terminal from a bootstrapping server functionality apparatus on the home network to a service providing node on the visited network. Some example embodiments limit impact on the bootstrapping server functionality apparatus incurred by transferring security key related policy information to a service providing node on the visited network by extending the Zn interface between the bootstrapping server functionality apparatus and a policy decisioning server on the home network such that the policy decisioning server is responsible for processing an authorization policy for the mobile terminal and modifying the user security settings package to include authorization policy information for transfer to the service providing node on the visited network. In some embodiments, the policy decisioning server comprises an application server on the home network that stores the detailed authorization policy for a particular service and mobile terminal (e.g. for a user of the mobile terminal).

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising:
at least one processor; and
at least one memory including computer program code, wherein the at least one processor, the at least one memory, and the computer program code are configured to cause the apparatus to at least:
receive, at a bootstrapping server function, a request for security key related policy information for a user equipment device, wherein the request is sent from a visited network, wherein the apparatus is connected to a home network, and wherein the user equipment device is registered to the home network and is seeking to access a service at a service providing node of the visited network;
send, from the bootstrapping server function, a service authorization information request including a user security settings package for the user equipment device, wherein the service authorization information request indicates that authorization policy information for the user equipment device be included in the user security settings package;
receive, at the bootstrapping server function, from a policy decisioning server, in response to the service authorization information request, a service authorization information answer comprising a modified user security settings package including the authorization policy information for the user equipment device, wherein the policy decisioning server is configured to implement a home access network discovery and selection function;
determine whether the received modified user security settings package includes a service specific authorization flag indicating the modified user security settings package has to be forwarded for processing to the policy decisioning server for the service to obtain authorization policy information;
generate, at the bootstrapping server function, the requested security key related policy information based on at least the modified user security settings package; and
send, from the bootstrapping server function, the requested security key related policy information to the service at the service providing node.

2. The apparatus of claim 1, wherein the request for security key related policy information comprises a request for security key information corresponding to security key information provided by the user equipment device to the service providing node for use in authorization of the user equipment device by the service providing node in accordance with a generic bootstrapping architecture authentication, and wherein the user security settings package comprises generic bootstrapping architecture user security settings.

3. The apparatus of claim 2, wherein the service providing node comprises a node configured to implement a visited access network discovery and selection function.

4. The apparatus of claim 1, wherein the service authorization information request is caused to be sent to the policy decisioning server.

5. The apparatus of claim 1, wherein apparatus is further configured to:
cause the service authorization information request to be sent in accordance with a web services protocol; and
receive the service authorization information answer in accordance with the web services protocol.

6. The apparatus of claim 1, wherein the apparatus is further configured to:
generate the requested security key related policy information prior to sending the requested security key information to be sent.

7. The apparatus of claim 1, wherein the apparatus is further configured to:
cause the user security settings package for the user equipment device to be requested from a server storing the user security settings package; and
receive, in response to the request for the user security settings package, the user security settings package for the user equipment device.

8. A non-transitory computer-readable storage medium encoded with instructions that, when executed by at least one processor, perform at least:
receiving, at a bootstrapping server function of a home network, a request for security key related policy information for a user equipment device, wherein the request is sent from a visited network, wherein the user equipment device is registered to the home network and is seeking to access a service at a service providing node of the visited network;
sending, from the bootstrapping server function, a service authorization information request including a user security settings package for the user equipment device, wherein the service authorization information request indicates that authorization policy information for the user equipment device be included in the user security settings package;
receiving, at the bootstrapping server function, from a policy decisioning server, in response to the service authorization information request, a service authorization information answer comprising a modified user security settings package including the authorization policy information for the user equipment device, wherein the policy decisioning server is configured to implement a home access network discovery and selection function;
determining whether the received modified user security settings package includes a service specific authorization flag indicating the modified user security settings package has to be forwarded for processing to the policy decisioning server for the service to obtain authorization policy information;
generating, at the bootstrapping server function, the requested security key related policy information based on at least the modified user security settings package; and
sending, from the bootstrapping server function, the requested security key related policy information to the service at the service providing node.

9. The non-transitory computer-readable storage medium of claim 8, wherein the request for security key related policy information comprises a request for security key information from the user equipment device to the service providing node for use in authorization of the user equipment device by the service providing node in accordance with a generic bootstrapping architecture authentication, and wherein the user security settings package comprises generic bootstrapping architecture user security settings.

10. The non-transitory computer-readable storage medium of claim 8, wherein the sending the service authorization information request is performed in accordance with a web services protocol, and wherein
the receiving of the service authorization information answer is performed in accordance with the web services protocol.

11. The non-transitory computer-readable storage medium of claim 8, wherein the generating the requested security key related policy information occurs prior to sending the requested security key information to be sent.

12. The non-transitory computer-readable storage medium of claim 8, further comprising:
requesting the user security settings package from a server storing the user security settings package; and
receiving, in response to the request for the user security settings package, the user security settings package for the user equipment device.

13. A method comprising:
receiving a request for security key related policy information for a user equipment device, wherein the request is sent from a visited network, wherein the apparatus is connected to a home network, and wherein the user equipment device is registered to the home network and is seeking to access a service at a service providing node of the visited network;
sending a service authorization information request including a user security settings package for the user equipment device, wherein the service authorization information request indicates that authorization policy information for the user equipment device be included in the user security settings package;
receiving, from a policy decisioning server, in response to the service authorization information request, a service authorization information answer comprising a modified user security settings package including the authorization policy information for the user equipment device, wherein the policy decisioning server is configured to implement a home access network discovery and selection function;
determining whether the received modified user security settings package includes a service specific authorization flag indicating the modified user security settings package has to be forwarded for processing to the policy decisioning server for the service to obtain authorization policy information;
generating the requested security key related policy information based on at least the modified user security settings package; and
sending the requested security key related policy information to the service at the service providing node.

14. The method of claim 13, wherein the request for security key related policy information comprises a request for security key information from the user equipment device to the service providing node for use in authorization of the user equipment device by the service providing node in accordance with a generic bootstrapping architecture authentication, and wherein the user security settings package comprises generic bootstrapping architecture user security settings.

15. The method of claim 13, wherein the sending the service authorization information is performed in accordance with a web services protocol, and wherein the receiving of the service authorization information answer is performed in accordance with the web services protocol.

16. The method of claim 13, wherein the generating the requested security key related policy information occurs prior to sending the requested security key information to be sent.

17. The method of claim 13, further comprising:
requesting the user security settings package from a server storing the user security settings package; and
receiving, in response to the request for the user security settings package, the user security settings package for the user equipment device.

* * * * *